US007330843B2

(12) United States Patent
Yamasaki et al.

(10) Patent No.: US 7,330,843 B2
(45) Date of Patent: Feb. 12, 2008

(54) MANAGING METHOD, MANAGING SYSTEM, COMPOSITE APPARATUS, ORDERING APPARATUS, COMPUTER PROGRAM AND MEMORY PRODUCT

(75) Inventors: Kimihito Yamasaki, Tenri (JP); Katsutoshi Ishikawa, Nara (JP); Masakatsu Nakamura, Kashihara (JP); Yasuhiro Nakai, Souraku-gun (JP); Kohji Oku, Yamatokohriyama (JP); Kumiko Ogino, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 536 days.

(21) Appl. No.: 10/028,825

(22) Filed: Dec. 28, 2001

(65) Prior Publication Data

US 2002/0133370 A1 Sep. 19, 2002

(30) Foreign Application Priority Data

Mar. 13, 2001 (JP) ............................. 2001-071050

(51) Int. Cl.
*G06F 17/00* (2006.01)
(52) U.S. Cl. ............................. 706/47; 700/95; 700/97; 705/1
(58) Field of Classification Search .................. 706/47; 700/95, 97; 705/1
See application file for complete search history.

(56) References Cited

U.S. PATENT DOCUMENTS

| | | | | | |
|---|---|---|---|---|---|
| 5,357,439 | A | * | 10/1994 | Matsuzaki et al. ............. | 700/96 |
| 5,570,292 | A | * | 10/1996 | Abraham et al. ............ | 700/157 |
| 5,625,776 | A | * | 4/1997 | Johnson ....................... | 705/27 |
| 6,101,483 | A | * | 8/2000 | Petrovich et al. .............. | 705/26 |
| 6,134,557 | A | * | 10/2000 | Freeman ..................... | 707/102 |
| 2002/0023046 | A1 | * | 2/2002 | Callahan et al. .............. | 705/37 |

FOREIGN PATENT DOCUMENTS

| | | |
|---|---|---|
| JP | 5-23288 | 3/1993 |
| JP | 5-151229 | 6/1993 |
| JP | 5-165843 | 7/1993 |
| JP | 5-189445 | 7/1993 |
| JP | 9-265361 | 10/1997 |

(Continued)

OTHER PUBLICATIONS

Intelligent agent platform for procurement, K. Subramanian, S. Lee, Tey Kar Shiang, Gan Beng Sue, Systems, Man, and Cybernetics, 1999. IEEE International Conference, vol. 3, Oct. 12-15, 1999, pp. 107-112.*

*Primary Examiner*—David Vincent
*Assistant Examiner*—Mai T Tran
(74) *Attorney, Agent, or Firm*—Nixon & Vanderhye P.C.

(57) ABSTRACT

An ordering apparatus receives unit information for specifying units constituting a composite apparatus to be ordered. The ordering apparatus creates composite state information for specifying a composite state of units based on the received unit information, according to a predetermined rule. Meanwhile, the composite apparatus recognizes unit information for specifying units constituting itself, and creates composite state information based on the recognized unit information, according to the same rule as the above rule. Then, the composite state information created by the ordering apparatus and the composite state information created by the composite apparatus are compared. Accordingly, it is possible to realize a managing system capable of appropriately managing a complicated composite apparatus at the time of ordering, shipment, setup, subsequent maintenance, etc.

9 Claims, 18 Drawing Sheets

FOREIGN PATENT DOCUMENTS

| | | |
|---|---|---|
| JP | 10-124526 | 5/1998 |
| JP | 10-198626 | 7/1998 |
| JP | 10-301996 | 11/1998 |
| JP | 10-340167 | 12/1998 |
| JP | 11-31178 | 2/1999 |
| JP | 11-272955 | 10/1999 |
| JP | 11-338927 | 12/1999 |
| JP | 2000-48066 | 2/2000 |
| JP | 2000-172465 | 6/2000 |
| JP | 2002-236590 | 8/2002 |

* cited by examiner

FIG. 4

UNIT TABLE 151

| UNIT TYPE | UNIT INFORMATION | | CREATING ORDER OF COMPOSITE STATE INFORMATION |
|---|---|---|---|
| | NAME OF UNIT | UNIT CODE | |
| PRINTER BODY | ABC PRINTER AR | PR001 | 1 |
| | ABC PRINTER AL | PR002 | |
| | ⋮ | ⋮ | |
| SCANNER | MONOCHROME SCANNER 1200dpi | SC001 | 2 |
| | MONOCHROME SCANNER 600dpi | SC002 | |
| | COLOR SCANNER 1200dpi | SC003 | |
| | COLOR SCANNER 400dpi | SC004 | |
| | ⋮ | ⋮ | |
| DOCUMENT FEEDER | SINGLE PAGE FEED (SPF) | DF001 | 3 |
| | REVERSIBLE (RADF) | DF002 | |
| | ⋮ | ⋮ | |
| FINISHER | SADDLE STITCH FINISHER | FN001 | 4 |
| | BOOKLET FINISHER | FN002 | |
| | ⋮ | ⋮ | |
| INTERFACE | XY INTERFACE | IF001 | 5 |
| | ⋮ | ⋮ | |
| EXPANSION UNIT | WZ UNIT 1 | PB001 | 6 |
| | WZ UNIT 2 | PB002 | |
| HARD DISK | HD 300MB | HD001 | 7 |
| | HD 1GB | HD002 | |
| | — | HD000 | |
| MEMORY | 16MB | M001 | 8 |
| | 32MB | M002 | |
| | 64MB | M003 | |
| | ⋮ | ⋮ | |
| | — | M000 | |

FIG. 5

COMPOSITE STATE INFORMATION FILE 152

| CUSTOMER CODE | NAME OF CUSTOMER | COMPOSITE APPARATUS INFORMATION | ADD. | COMPOSITE STATE INFORMATION | ORDER DATE |
|---|---|---|---|---|---|
| 0001 | ABC SYSTEM | 1001 | 63.21.1 | 34120103 | 2001/2/17 |
| | | 1002 | 63.21.2 | 34231001 | 2001/3/20 |
| | | 1003 | 63.21.3 | 23340022 | 2001/3/26 |
| | | ... | ... | ... | ... |
| 0002 | XY ENGINEERING | 2001 | 63.35.3 | 14222356 | 2000/6/12 |
| | | 2002 | 54.20.3 | 14360022 | 2001/5/16 |
| | | 2003 | — | 34222101 | 2001/10/22 |
| | | ... | ... | ... | ... |
| 0003 | YZ Ltd. | 3001 | 23.35.3 | 14222356 | 2000/2/15 |
| | | 3002 | — | 22235202 | 2001/12/15 |
| | | 3003 | 22.21.2 | 12325211 | 2001/3/13 |
| | | ... | ... | ... | ... |
| ... | ... | | | | |

FIG. 6

| CUSTOMER CODE | 0001 | ▶ | NAME OF CUSTOMER | ABC SYSTEM | ▶ |

COMPOSITE APPARATUS INFORMATION 1001 ▶
CHOOSE YOUR DESIRED UNIT

① PRINTER BODY: ABC PRINTER DL ▶ PR003 ▶
② SCANNER: COLOR SCANNER 400dpi ▶ SC004 ▶
③ DOCUMENT FEEDER: SINGLE PAGE FEEDER ▶ DF001 ▶
④ FINISHER: BOOKLET FINISHER ▶ FN002 ▶
⑤ INTERFACE: ——— ▶ IF000 ▶
⑥ EXPANSION UNIT: WZ UNIT 1 ▶ PB001 ▶
⑦ HARD DISK: ——— ▶ HD000 ▶
⑧ MEMORY: 64MB ▶ M003 ▶

TOTAL ￥ 298,000 ▶  COMPOSITE STATE INFORMATION 3 4 1 2 0 1 0 3

ORDER    CANCEL

FIG. 14

COMPOSITE STATE INFORMATION FILE 352

| CUS-TOMER CODE | NAME OF CUSTOMER | COMPOSITE APPARATUS INFORMATION | ADD. | COMPOSITE STATE INFORMATION | ORDER DATE | ORDERING APPARATUS INFORMATION ||
|---|---|---|---|---|---|---|---|
| | | | | | | ORDERED APPARATUS CODE | ORDERED APPARATUS ADD. |
| 0001 | ABC SYSTEM | 1001 | 63.21.1 | 34120103 | 2001/2/17 | 3001 | 193.25.6 |
| | | 1002 | 63.21.2 | 34231001 | 2001/3/20 | 3003 | 201.22.2 |
| | | 1003 | 63.21.3 | 23340022 | 2001/3/26 | 3003 | 201.22.2 |
| | | ... | ... | ... | ... | ... | ... |
| 0002 | XY ENGI-NEERING | 2001 | 63.35.3 | 14222356 | 2000/6/12 | 3002 | 202.35.3 |
| | | 2002 | 54.20.3 | 14360022 | 2001/5/16 | 3001 | 193.25.6 |
| | | 2003 | — | 34222101 | 2001/10/22 | 3001 | 193.25.6 |
| | | ... | ... | ... | ... | ... | ... |
| 0003 | YZ Ltd. | 3001 | 23.35.3 | 14222356 | 2000/2/15 | 3004 | 402.2.25 |
| | | 3002 | — | 22235202 | 2001/12/15 | 3004 | 402.2.25 |
| | | 3003 | 22.21.2 | 12325211 | 2001/3/13 | 3004 | 402.2.25 |
| | | ... | ... | ... | ... | ... | ... |
| ... | ... | | | | | | |

MANAGING METHOD, MANAGING SYSTEM, COMPOSITE APPARATUS, ORDERING APPARATUS, COMPUTER PROGRAM AND MEMORY PRODUCT

BACKGROUND OF THE INVENTION

1. Field of the Invention

The present invention relates to a managing method for ordering a composite apparatus formed by composing a plurality of units through an ordering apparatus and for managing the ordered composite apparatus; a managing system; a composite apparatus and an ordering apparatus constituting the managing system; and a computer program and a memory product for causing a computer to function as the ordering apparatus.

2. Description of Related Art

In order to meet wide needs of customers, the supply of composite apparatuses that are customized according to the needs of the customers, such as a composite machine made up of a suitable composition of a copying machine, a facsimile machine (hereinafter referred to as the "FAX machine"), a printer, etc. and a personal computer to which a plurality of options are added, is on the increase. In the case of a composite apparatus of a copying machine, for example, a coping machine as a base unit is composed with a number of units, such as a monochrome scanner, a color scanner, a FAX modem, an extension memory and a staple finisher, according to the need of a customer, and an order is made.

A conventional ordering system for such a composite apparatus is disclosed in Japanese Patent Application Laid-Open No. 5-151229 (1993). Japanese Patent Application Laid-Open No. 5-151229 (1993) discloses a system for automatically creating a product structure by presenting units to a user with the use of a computer and requesting the user to select presented units. Moreover, Japanese Patent Application Laid-Open Nos. 5-23288 (1993) and 11-272955 (1999) disclose a portable terminal used for ordering a product and an ordered contents output apparatus that present a list of selections of products to a user and output the ordered contents in accordance with the contents selected by the user.

However, the conventional systems were designed for use before the ordering stage, and have problems that they do not consider the management of composite apparatuses after the ordering stage, such as the subsequent shipment, setup, maintenance and addition of a unit. In recent years, the number of units to be composed is increasing and the composition thereof also increases exponentially. Therefore, there is a fear that the ordered composite apparatus is composited wrongly in the shipment from a factory, the setup in a shipping destination or other occasion, resulting in a problem that it is difficult to sufficiently manage a complicated composite apparatus.

Furthermore, although composite apparatuses of a copying machine, etc. need maintenance after the setup and wide support for an addition or change of a unit, the conventional systems have a problem that they can not meet such a demand sufficiently.

BRIEF SUMMARY OF THE INVENTION

The present invention has been made with the aim of solving the above problems, and its object is to provide a managing system capable of appropriately managing a complicated composite apparatus at the time of ordering, shipment, setup and even in the subsequent maintenance by creating a composite state of units by each of an ordering apparatus and a composite apparatus according to a common rule and managing them; a composite apparatus and an ordering apparatus constituting the managing system; and a computer program and a memory product for causing a computer to function as the ordering apparatus.

Another object of the present invention is to provide a managing system capable of responding quickly even in the subsequent maintenance by storing the state of a composite apparatus ordered by an ordering apparatus; a composite apparatus and an ordering apparatus constituting the managing system; and a computer program and a memory product for causing a computer to function as the ordering apparatus.

Still another object of the present invention is to provide a managing method capable of managing whether there is no shortage or excess of units constituting a composite apparatus during the ordering, shipment and setup by comparing composite state information created in each of an ordering apparatus and a composite apparatus and managing them and also capable of appropriately managing the composite state information after addition or change of a unit even when the unit is added or changed after the setup; a managing system; a composite apparatus and an ordering apparatus constituting the managing system; and a computer program and a memory product for causing a computer to function as the ordering apparatus.

Yet another object of the present invention is to provide a managing system capable of totally supporting a composite apparatus from an order to maintenance in a more effective manner by providing a managing apparatus for totally managing this system.

A managing method according to the present invention is a managing method for ordering a composite apparatus formed by composing a plurality of units through an ordering apparatus and for managing said ordered composite apparatus, and characterized by comprising the steps of causing said ordering apparatus to receive unit information for specifying units constituting a composite apparatus and create composite state information for specifying a composite state of units based on the received unit information, according to a predetermined rule; causing said composite apparatus to recognize unit information for specifying units to be composed itself and create composite state information for specifying a composite state of units based on the recognized unit information, according to the same rule as said rule; and comparing the composite state information created by said ordering apparatus and the composite state information created by said composite apparatus.

Besides, a managing system according to the present invention is a managing system comprising an ordering apparatus and a composite apparatus formed by composing a plurality of units, for ordering the composite apparatus through the ordering apparatus and for managing the ordered composite apparatus, and characterized in that the ordering apparatus comprises: means for receiving unit information for specifying units constituting a composite apparatus; and first creating means for creating composite state information for specifying a composite state of units based on the received unit information, according to a predetermined rule, and the composite apparatus comprises: means for recognizing unit information for specifying units to be composed itself and second creating means for creating composite state information for specifying a composite state of units based on the recognized unit information, according to the same rule as the rule.

Moreover, the managing system according to the present invention is characterized in that the ordering apparatus further comprises storing means for storing the composite state information created by the first creating means in association with composite apparatus information for specifying the composite apparatus.

Furthermore, the managing system according to the present invention is characterized in that the ordering apparatus and the composite apparatus are connected through a communication network, the composite apparatus further comprises means for transmitting the composite state information created by the second creating means to the ordering apparatus, and the ordering apparatus further comprises means for comparing the transmitted composite state information and the composite state information corresponding to the composite apparatus information stored by the storing means.

Additionally, the managing system according to the present invention is characterized by further comprising a managing apparatus, connected to the ordering apparatus and the composite apparatus through a communication network, for managing the composite apparatus, and characterized in that the ordering apparatus further comprises means for transmitting the composite state information created by the first creating means and composite apparatus information for specifying the composite apparatus to the managing apparatus, the composite apparatus further comprises means for transmitting the composite state information created by the second creating means to the managing apparatus, and the managing apparatus further comprises means for comparing the composite state information transmitted from the ordering apparatus and the composite state information transmitted from the composite apparatus.

A composite apparatus according to the present invention is a composite apparatus formed by composing a plurality of units, and characterized by comprising: means for recognizing unit information for specifying units to be composed; means for creating composite state information for specifying a composite state of units based on the recognized unit information, according to a predetermined rule; and means for outputting the created composite state information to exterior.

Moreover, an ordering apparatus according to the present invention is an ordering apparatus for ordering a composite apparatus formed by composing a plurality of units, and characterized by comprising: means for receiving unit information for specifying units constituting a composite apparatus; means for creating composite state information for specifying a composite state of units based on the received unit information, according to a predetermined rule; and means for storing the created composite state information in association with composite apparatus information for specifying the composite apparatus; and means for comparing composite state information transmitted from exterior and created according to the same rule as the rule and the composite state information corresponding to the composite apparatus information stored by the storing means.

In addition, a computer program of the present invention is a computer program for ordering a composite apparatus formed by composing a plurality of units, and characterized by executing the step of causing a computer to receive unit information for specifying units constituting a composite apparatus; causing a computer to create composite state information for specifying a composite state of units based on the received unit information, according to a predetermined rule; causing a computer to store the created composite state information in association with composite apparatus information for specifying the composite apparatus; and causing a computer to compare composite state information transmitted from exterior and created according to the same rule as the rule and the composite state information corresponding to the composite apparatus information stored in the step for storing.

Further, a computer readable memory product according to the present invention is a memory product readable by computers and storing therein a computer program for ordering a composite apparatus formed by composing a plurality of units, and characterized by storing a computer program including: computer readable code means to cause a computer for receiving unit information for specifying units constituting a composite apparatus; computer readable code means to cause a computer for creating composite state information for specifying a composite state of units based on the received unit information, according to a predetermined rule; computer readable code means to cause a computer for storing the created composite state information in association with composite apparatus information for specifying the composite apparatus; and computer readable code means to cause a computer for comparing composite state information transmitted from exterior and created according to the same rule as the rule and the stored composite state information corresponding to the composite apparatus information.

In the present invention, an ordering apparatus receives unit information for specifying units constituting a composite apparatus to be ordered. The ordering apparatus creates composite state information for specifying a composite state of units based on the received unit information, according to a predetermined rule. Meanwhile, the composite apparatus recognizes unit information for specifying units constituting itself, and creates composite state information based on the recognized unit information, according to the same rule as the above rule. In other words, since the pieces of composite state information are created by both the ordering apparatus and the composite apparatus based on the composite state of units, according to the common rule, and managed, it is possible to realize collective management in any situations, such as during the ordering, shipment from a factory and setup at the customer's place, and consequently it becomes possible to prevent a difference between the composite apparatus at ordering and the composite apparatus at setting up.

Moreover, in the present invention, since the created composite state information is stored in the ordering apparatus in association with composite apparatus information for specifying the composite apparatus, it is possible to recognize the state of the composite apparatus after the supply of the composite apparatus and quickly respond to the customer at the time of maintenance or other occasion.

Furthermore, in the present invention, the ordering apparatus and the composite apparatus are connected through a communication network, and the created composite state information is transmitted from the composite apparatus to the ordering apparatus. Since the transmitted composite state information and the stored composite state information are compared in the ordering apparatus, it is possible to prevent a difference between the composite apparatus ordered and the composite apparatus set up; and, even when a unit is added or changed, the unit to be added or changed can be surely composed and the ordering apparatus can readily grasp the state of the composite apparatus after the addition.

Additionally, in the present invention, the ordering apparatus, the composite apparatus and the managing apparatus for managing the composite apparatus are connected through the communication network, and the created composite state information and the composite apparatus information for specifying the composite apparatus are transmitted from the ordering apparatus to the managing apparatus. Similarly, the created composite state information is transmitted from the composite apparatus to the managing apparatus. Then, the managing apparatus compares the composite state information transmitted from the ordering apparatus and the composite state information transmitted from the composite apparatus, and therefore, even when a large number of ordering apparatuses and composite apparatuses are present, it is possible to obtain advantageous effects, for example, the use of this system can be effectively supported by collective management.

The above and further objects and features of the invention will more fully be apparent from the following detailed description with accompanying drawings.

BRIEF DESCRIPTION OF THE SEVERAL VIEWS OF THE DRAWINGS

FIG. 4 is an explanatory view showing one example of the record layout of a unit table;

FIG. 5 is an explanatory view showing one example of the record layout of a composite state information file;

FIG. 6 is an explanatory view showing a display example on the screen of the ordering apparatus in making an order;

FIG. 14 is an explanatory view showing one example of the record contents in a composite state information file according to Embodiment 2;

DETAILED DESCRIPTION OF THE PREFERRED EMBODIMENTS

The following description will explain the present invention in detail with reference to the drawings illustrating some embodiments thereof.

Embodiment 1

In this embodiment, a composite apparatus is explained as a copying machine, a FAX machine, a printer, or a composite machine of these machines, but the composite apparatus is not necessarily limited to these machines and may be other composite apparatus such as a personal computer, a working robot, an audio set, a game machine, etc.

Figure 1:
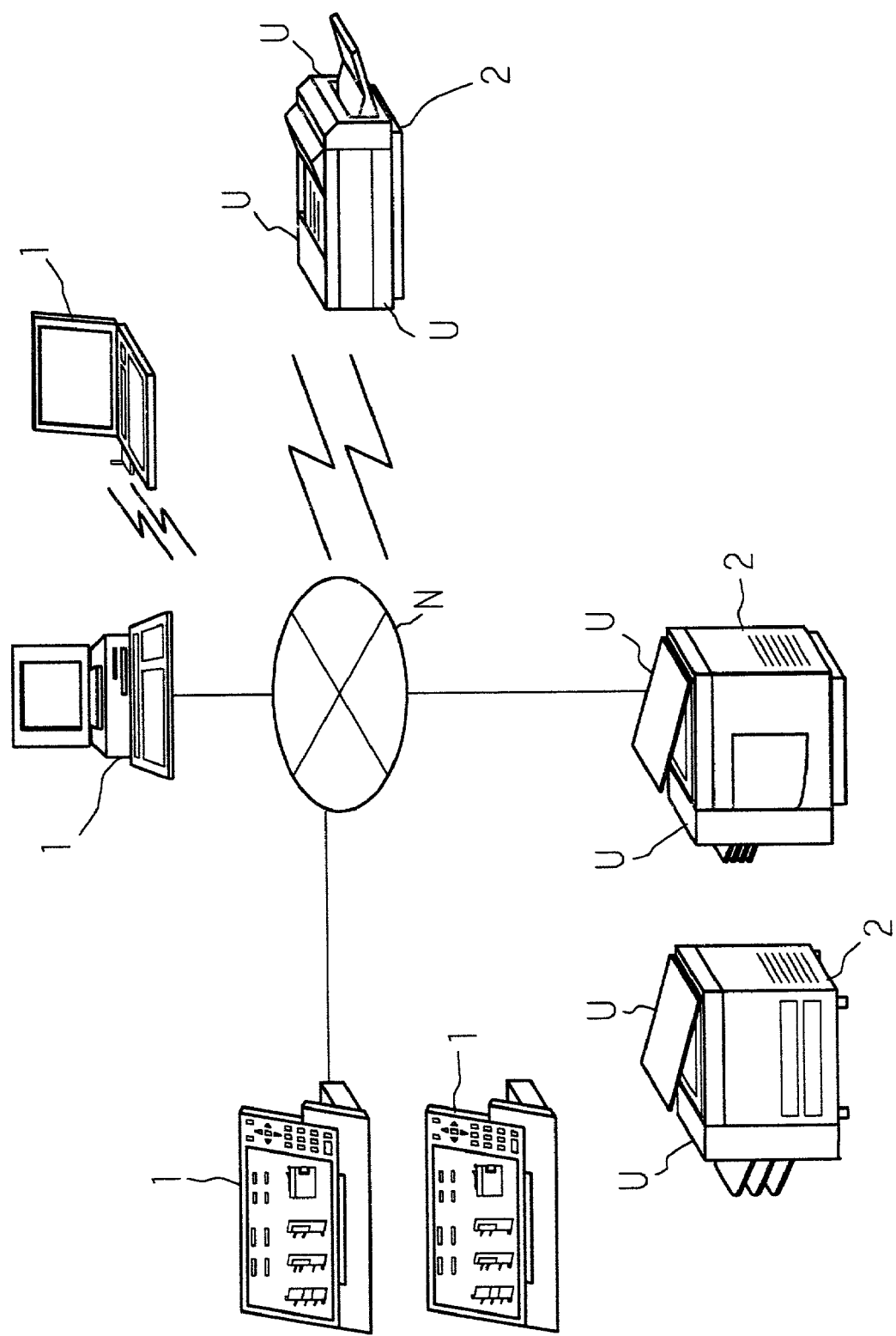
FIG. 1 is a block diagram showing a structural example of a managing system according to the present invention.

FIG. 1 is a block diagram showing a structural example of a managing system according to the present invention. In FIG. 1, each 2 represents a composite apparatus of a copying machine, etc., and each 1 is an ordering apparatus (computer) for ordering a composite apparatus 2 or an ordering apparatus such as a portable information processing device or a cellular phone. Each composite apparatus 2 is constructed by composing a plurality of units U, such as a memory, a finisher and a scanner, not shown, according to the request of a customer. These composite apparatuses 2 and ordering apparatuses 1 are connected through a communication network N such as the Internet or a dedicated line. Note that the composite apparatuses 2 and ordering apparatuses 1 are not necessarily connected through the communication network N as shown in FIG. 1.

The seller of the composite apparatus 2 has a business discussion with a customer and orders a product with the use of the ordering apparatus 1. In this case, the ordering apparatus 1 creates composite state information (for example, a specific code) for specifying a composite state of units U constituting a composite apparatus 2 to be ordered. Meanwhile, when a plurality of units U constituting the composite apparatus 2 are composed to set up the composite apparatus 2 by the seller at the place of the customer, the composite apparatus 2 recognizes the connected units U and creates composite state information based on the result of the recognition. Then, the seller compares both the pieces of composite state information created by the composite apparatus 2 and the ordering apparatus 1, and judges whether they match.

Figure 2:
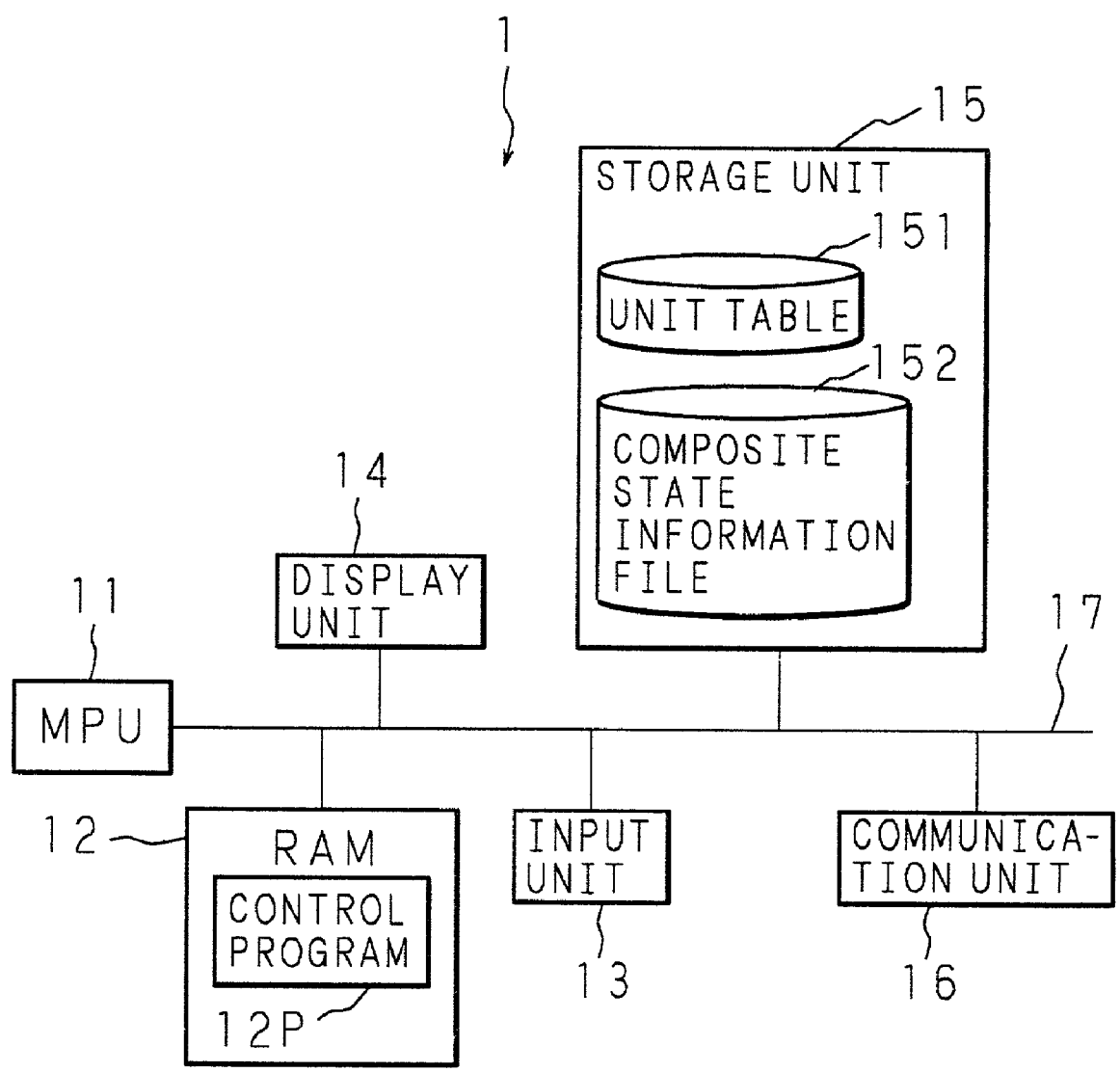
FIG. 2 is a block diagram showing a structural example of an ordering apparatus according to the present invention.

FIG. 2 is a block diagram showing a structural example of the ordering apparatus 1 according to the present invention. As shown in FIG. 2, connected to an MPU 11 through a bus 17 are a RAM 12, a storage unit 15 such as a hard disk, a communication unit 16 such as a modem for transmitting and receiving information to/from the composite apparatus 2, a display unit 14 such as a liquid crystal display, and an input unit 13 such as a keyboard and a mouse. Besides, a control program 12P for controlling the storage unit 15, display unit 14, input unit 13, etc. is stored in the RAM 12. Note that an ordering apparatus 1 having no communication function does not comprise the communication unit 16.

The storage unit 15 comprises a unit table 151 storing information for specifying units constituting a composite apparatus 2, and a composite state information file 152 storing composite state information for specifying a composite state of units U and composite apparatus information for specifying a composite apparatus 2. Their detail will be described later.

Figure 3:
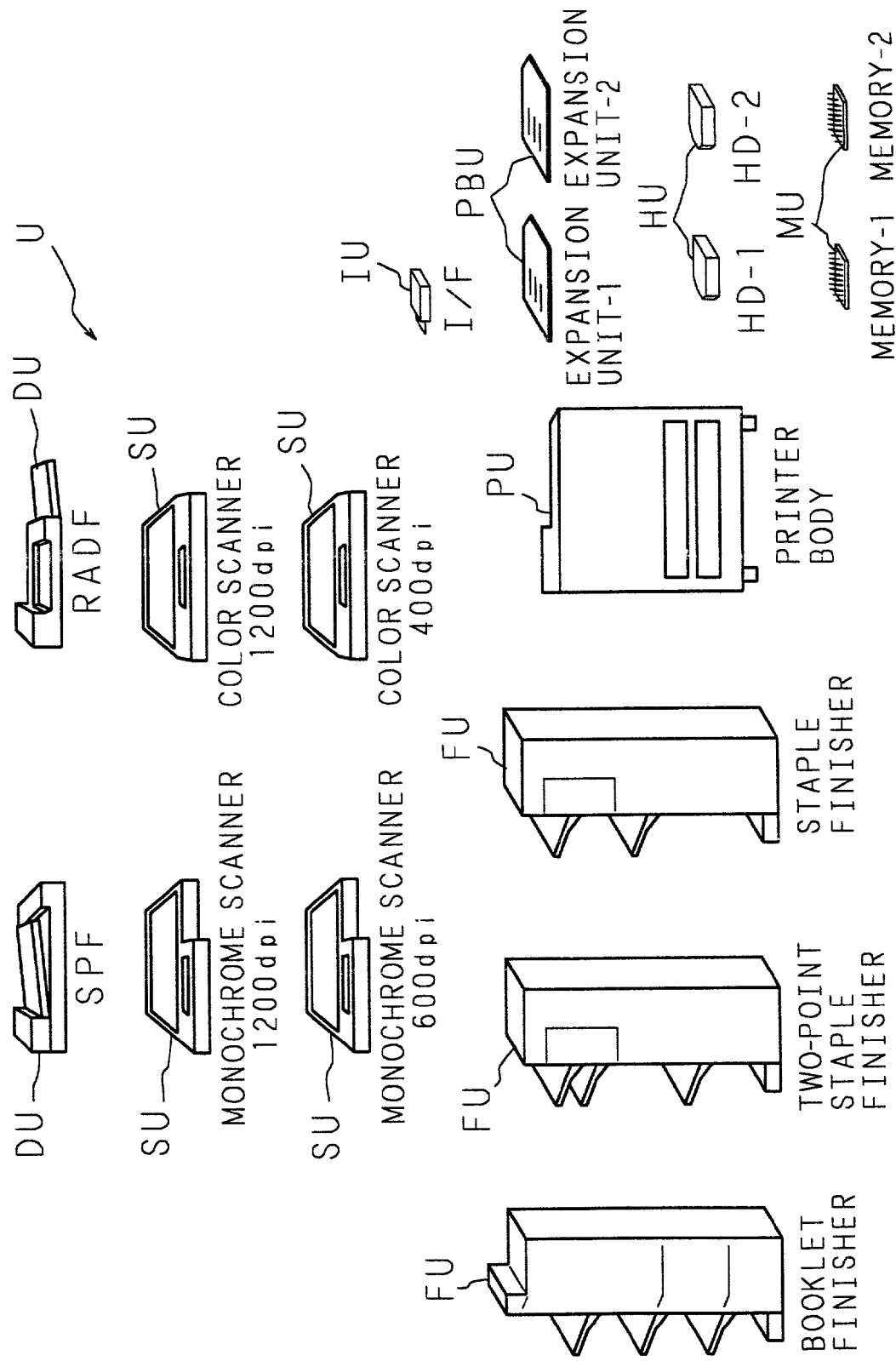
FIG. 3 is an explanatory view showing specific examples of units.

FIG. 3 is an explanatory view showing specific examples of the units U. When the composite apparatus 2 according to the present invention is a copying machine, the units U forming the copying machine are the units U shown in FIG. 3. As the units U, a printer body unit PU for forming images and a scanner unit SU for reading a document placed on a glass platen and outputting electric signals corresponding to the read information are prepared. As these units U, those having many performances to meet a variety of needs of customers are prepared. For example, for the scanner unit SU, a "monochrome scanner 1200 dpi (dot per inch)", "monochrome scanner 600 dpi", "color scanner 600 dpi", "color scanner 400 dpi", etc. are prepared according to the monochrome or color and also the resolution. A customer can obtain a customized composite apparatus by telling the seller necessary performances.

For a document feeder unit DU for feeding a document to the glass platen of the scanner unit SU, a single page feeder (SPF) and a reversible automatic document feeder (RADF) are prepared. Moreover, for a finisher unit FU for sorting sheets having images formed thereon, a plurality of finisher units FU are prepared according to the functions, for example, whether a staple is provided. In addition, an interface unit IU, an expansion unit PBU such as a scan to e-mail board and a FAX board, a memory unit MU, a hard disk unit HU, etc. are prepared. Note that, for the memory unit MU and the hard disk unit HU, various types of units U are prepared according to the memory capacity.

FIG. 4 is an explanatory view showing one example of the record layout of the unit table 151. As shown in FIG. 4, unit information for specifying units U are respectively stored. The information for specifying the units U are, for example, unit names and unique unit codes for identifying the units U. For instance, when a unit U is the monochrome scanner 600 dpi, the unit code is "SC002". Such unit information is classified according to the type of the unit U and stored in a unit type field. Moreover, the order in which composite state information for specifying a composite state of units U is stored is stored as table data in the field of the creating order of composite state information. The creating order of composite state information is stored with a unique value that is added according to the unit type.

The procedure for creating the composite state information will be explained below. First, the unit information of units constituting a composite apparatus to be ordered is received from the input unit 13. Here, assume that an "ABC printer AL" is selected as the printer body, a "color scanner 400 dpi" is selected as the scanner, a "reversible automatic document feeder (RADF)" is selected as the document feeder, a "saddle stitch finisher" is selected as the finisher, no interface is selected because the interface is unnecessary, a "WZ unit 1" is selected as the expansion unit, no hard disk is selected because the hard disk is also unnecessary, and "64 MB" is selected as the memory.

In this case, the MPU 11 refers to the unit table 151 by using the received unit name as a key, extracts the last digit in the unit code and stores it in the RAM 12 according to the creating order of composite state information. Besides, when no unit U is selected, the MPU 11 reads the last digit "0" in a unit code corresponding to "none", and stores it in the RAM 12 together with a corresponding creating order of composite state information. More specifically, "2" is read for the printer body "ABC printer AL", "4" is read for the scanner "color scanner 400 dpi", "2" is read for the document feeder "reversible automatic document feeder (RADF)", "1" is read for the finisher "saddle stitch finisher", "0" is read for the interface, "1" is read for the expansion unit "WZ unit 1", "0" is read for the hard disk, and "3" is read for the memory "64 MB". Then, the last digits are sorted according to the creating order of composite state information, thereby creating composite state information "24210103". Note that the above-described creating method is merely one example, and it is, of course, possible to use other creating method if it is a method capable of identifying the composite state of units U.

FIG. 5 is an explanatory view showing one example of the record layout of the composite state information file 152. As shown in FIG. 5, unique composite apparatus information for specifying a composite apparatus 2 is stored in association with the name of a customer possessing the composite apparatus 2 and a unique customer code for specifying the customer. For example, for a customer "ABC system (customer code 0001)", composite apparatuses 2 specified by the composite apparatus information 1001, 1002, 1003 . . . are stored. Moreover, the IP (Internet Protocol) addresses of the composite apparatuses 2, the composite state information created by the above-described method, the order date, etc. are stored in association with the composite apparatus information. Note that no address is stored for a composite apparatus 2 having no communicating function.

FIG. 6 is an explanatory view showing a display example on the screen of the ordering apparatus 1 in making an order. When an order is to be made, the ordering apparatus 1 activates a browser stored in the storage unit 15, establishes communication with a managing apparatus (not shown) and downloads an HTML (Hypertext Markup Language) file to display the order page shown in FIG. 6 on the display unit 14. Note that these display contents may be stored in the storage unit 15 in advance for display. An orderer inputs a customer code or the name of a customer, and also inputs the composite apparatus information. Next, the orderer selects a desired unit U from a pull-down box. When selected, the MPU 11 refers to the unit table 151 and displays the corresponding unit code.

After making selections for all units U, the ordering apparatus 1 calculates the total amount with reference to an amount information table, not shown, stored in the storage unit 15, and displays it. Moreover, the ordering apparatus 1 creates composite state information based on the received unit information by the above-described method and outputs it to the display unit 14. Further, if the ordering apparatus 1 has a communicating function, the composite apparatus information, customer code and composite state information are transmitted to the managing apparatus or a computer in a factory or the like, not shown, by clicking the order button.

Figure 7:
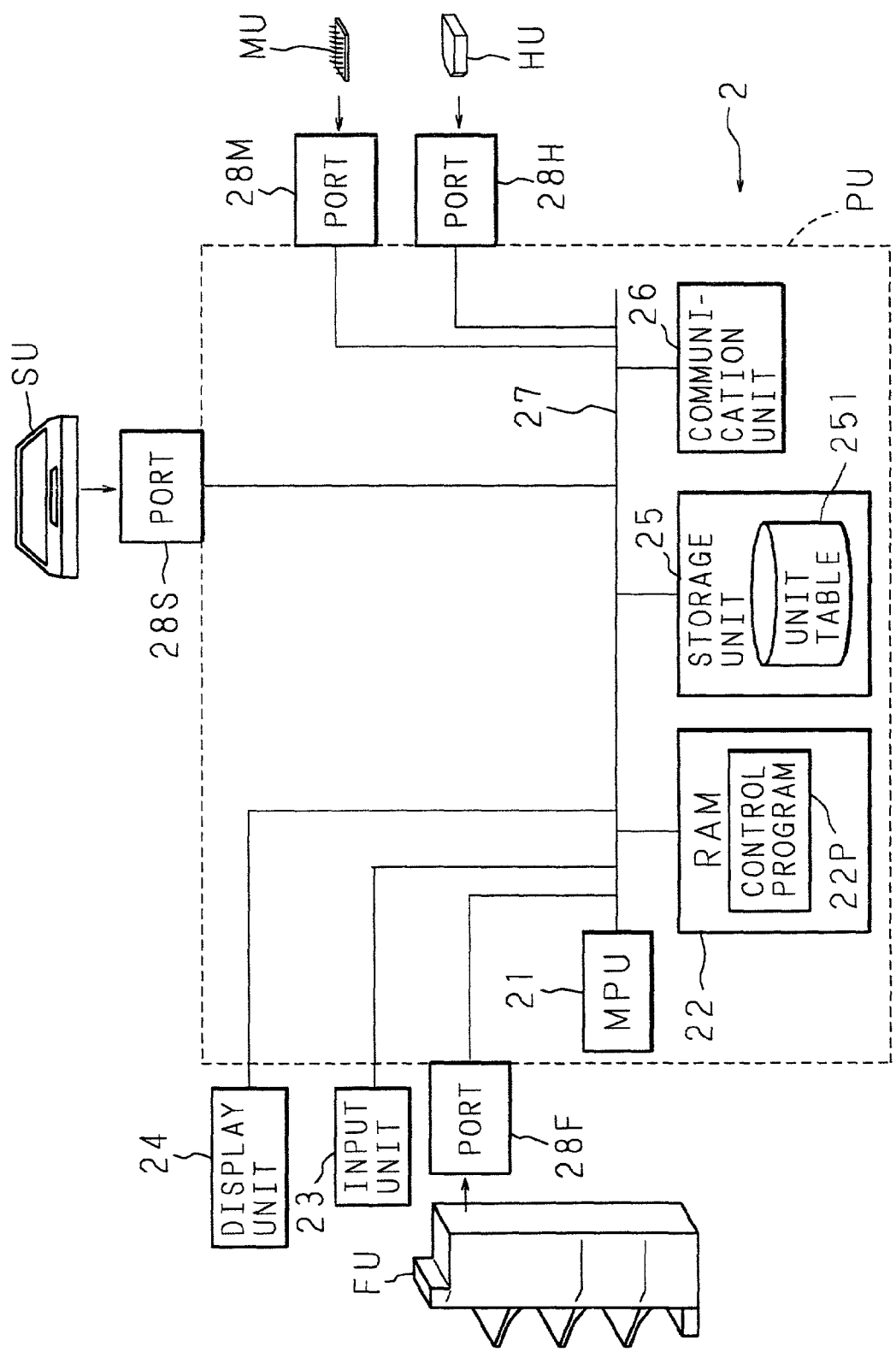
FIG. 7 is a block diagram showing a structural example of a composite apparatus according to the present invention.

FIG. 7 is a block diagram showing a structural example of the composite apparatus 2 according to the present invention. As shown in FIG. 7, the composite apparatus 2 comprises the printer body unit PU as the main unit, the memory unit MU, the scanner unit SU, the hard disk unit HU, the finisher unit FU, etc. As shown in FIG. 7, a RAM 22, a storage unit 25, a communication unit 26 for transmitting/receiving information to/from the ordering apparatus 1, etc., a display unit 24, such as a liquid crystal display, and an input unit 23, such as an operation panel, are connected to the printer body unit PU through a bus 27. Further, a control program 22p for controlling the storage unit 25, display unit 24 and input unit 23, etc. is stored in the RAM 22.

Figure 8:
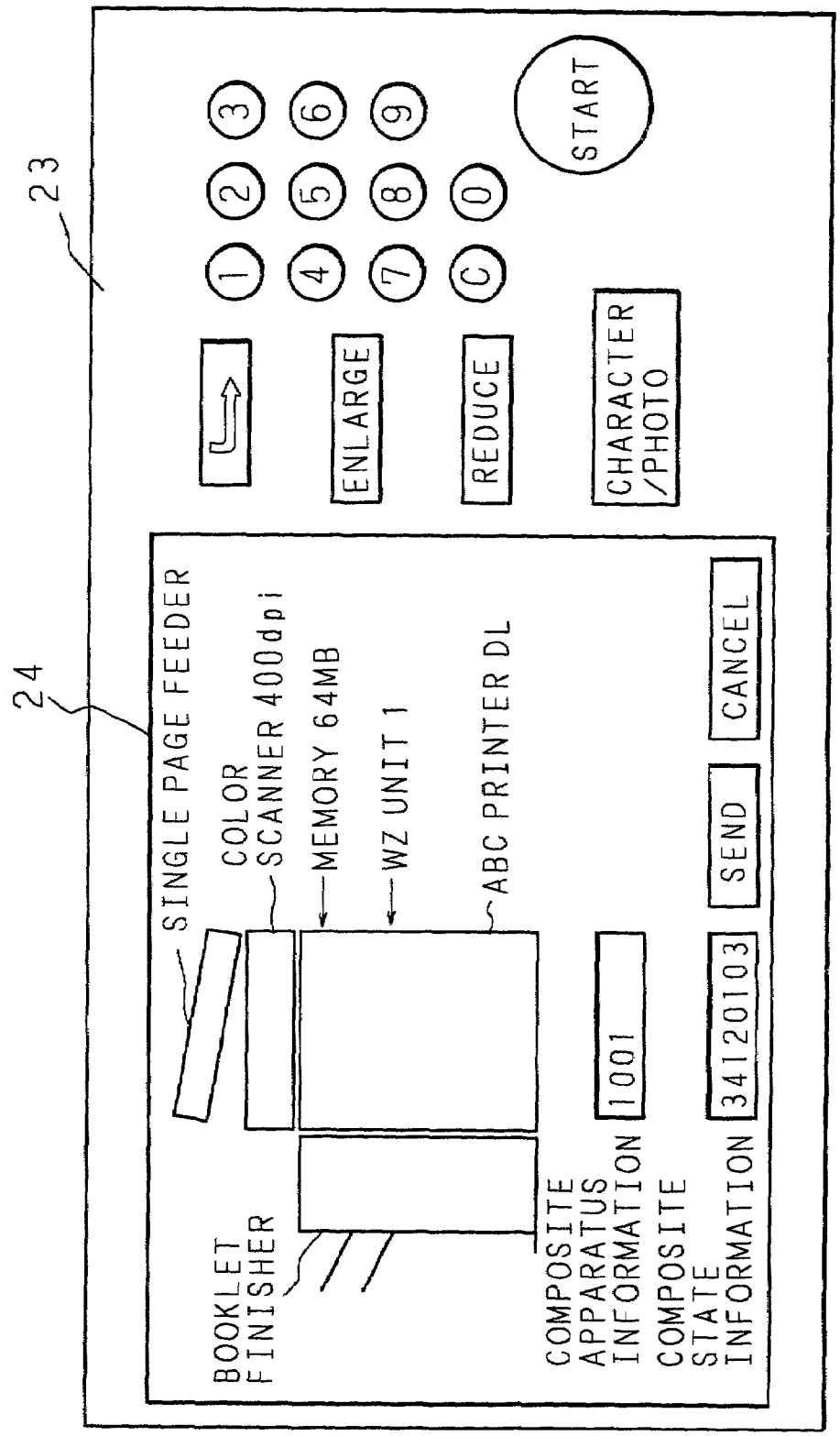
FIG. 8 is an explanatory view showing one example of the image of the display contents on a display unit.

In addition, a unit table 251 having the record contents common to the unit table 151 of the above-described ordering apparatus 1 is stored in the storage unit 25. The printer body unit PU has connection ports 28S, 28M, 28H, 28F . . . (hereinafter represented as the connection ports 28), such as serial ports or USB (Universal Serial Bus) ports, so that it can be connected to the units U such as the finisher. FIG. 8 is an explanatory view showing one example of the image of the display contents on the display unit 24. With reference to FIG. 7 and FIG. 8, the creating procedure of the composite state information will be explained.

The printer body unit PU has a plug-and-play function, and, when other unit U is connected to the connection port 28, the MPU 21 receives this as a trigger and reads the unit information of the connected unit U. In the units U to which a finisher, etc. are connected, their own unit information is stored, and the MPU 21 recognizes the composed units by reading the unit information of these units U. In addition, it is also possible to provide each unit U with a dip switch so as to cause the controller of an arbitrary unit U to read the settings of the dip switch and recognize the unit information. Then, the MPU 21 refers to the unit table 251 by using the read unit information as a key and creates the composite state information by the above-described method. The composite state information created by the MPU 21 is outputted to the display unit 24 and displayed as shown in FIG. 8. Besides, it is also possible that the MPU 21 reads the unit names from the unit table by using the read unit information as a key and displays them on the display unit 24.

The composite apparatus information for specifying a composite apparatus 2 may be inputted from the input unit 23 and stored in the storage unit 25 during the setup, or transmitted to the composite apparatus 2 by the communicating means and stored in the storage unit 25. The stored composite apparatus information is read and displayed as shown in FIG. 8. Here, after the setup, the seller can judge whether the units U are composed without excess or shortage by comparing the composite state information outputted from the composite apparatus 2 with the composite state information of this composite apparatus 2 stored in the storage unit 15 of the ordering apparatus 1. Note that whether these pieces of composite state information correspond with each other can be judged by the seller based on the information displayed on the display unit 24 in the above-mentioned manner, but it is also possible to read the composite apparatus information and the composite state information stored in the storage unit 25 and transmit them to the ordering apparatus 1 from the composite apparatus 2 through the network so as to cause the MPU 11 of the ordering apparatus 1 to make a comparison. In this case, the MPU 11 searches the composite state information file 152 by using the transmitted composite apparatus information as a key and extracts the corresponding composite state information. Then, the MPU 11 compares the transmitted composite state information and the extracted composite state information.

Figure 9:
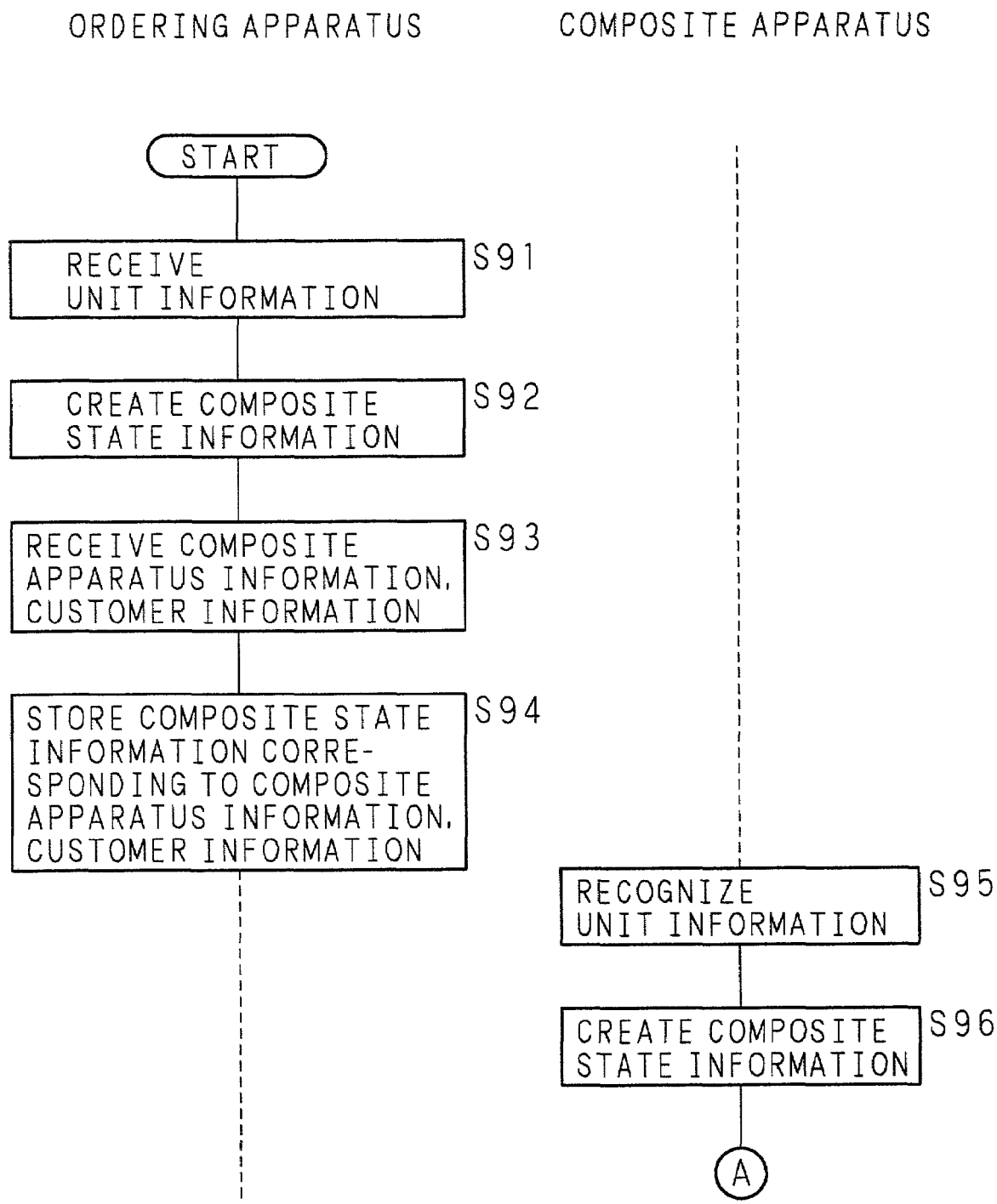
FIG. 9 is a flowchart showing the procedure performed by the managing system according to the present information.
Figure 10:
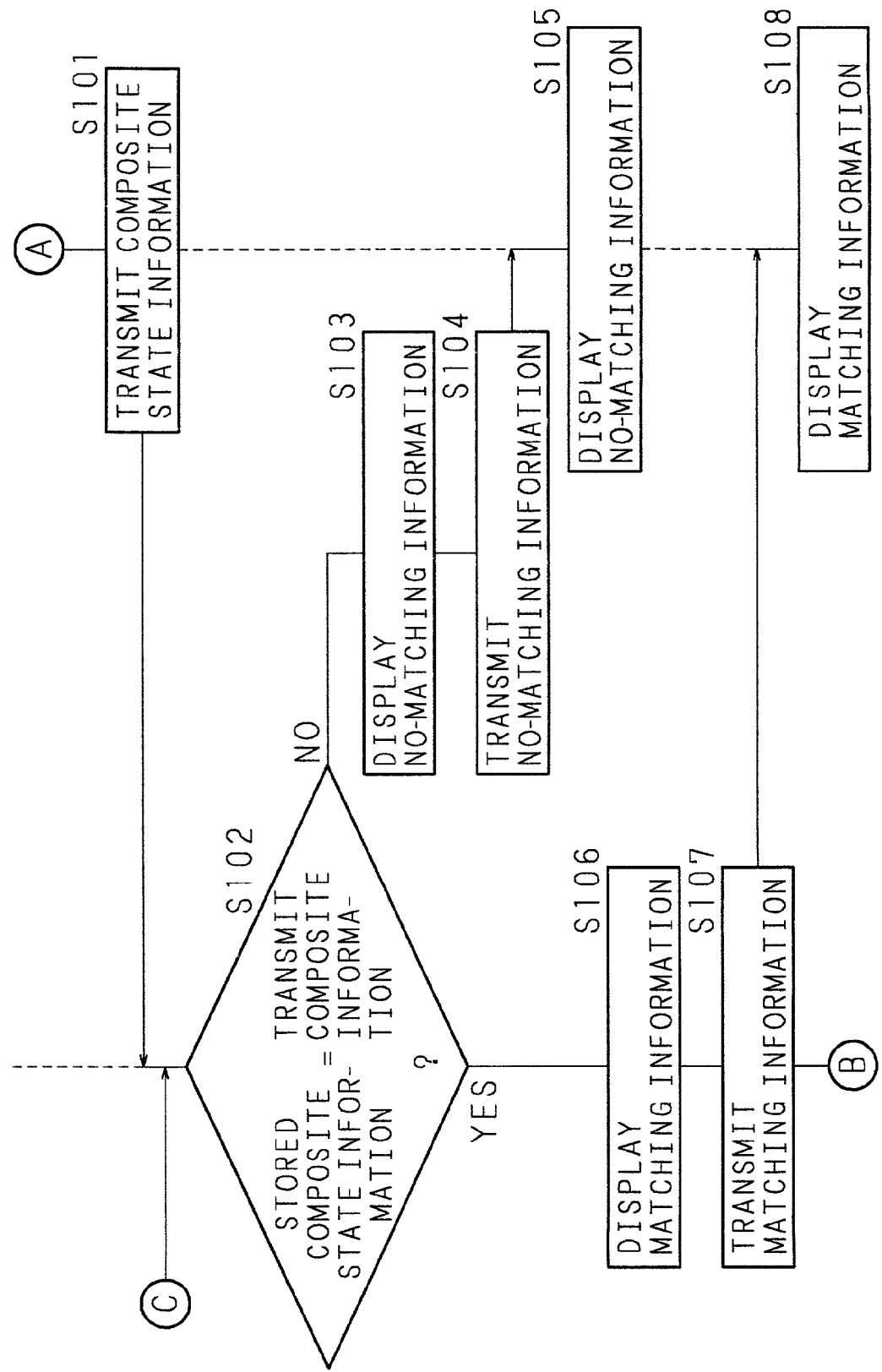
FIG. 10 is a flowchart showing the procedure performed by the managing system according to the present information.
Figure 11:
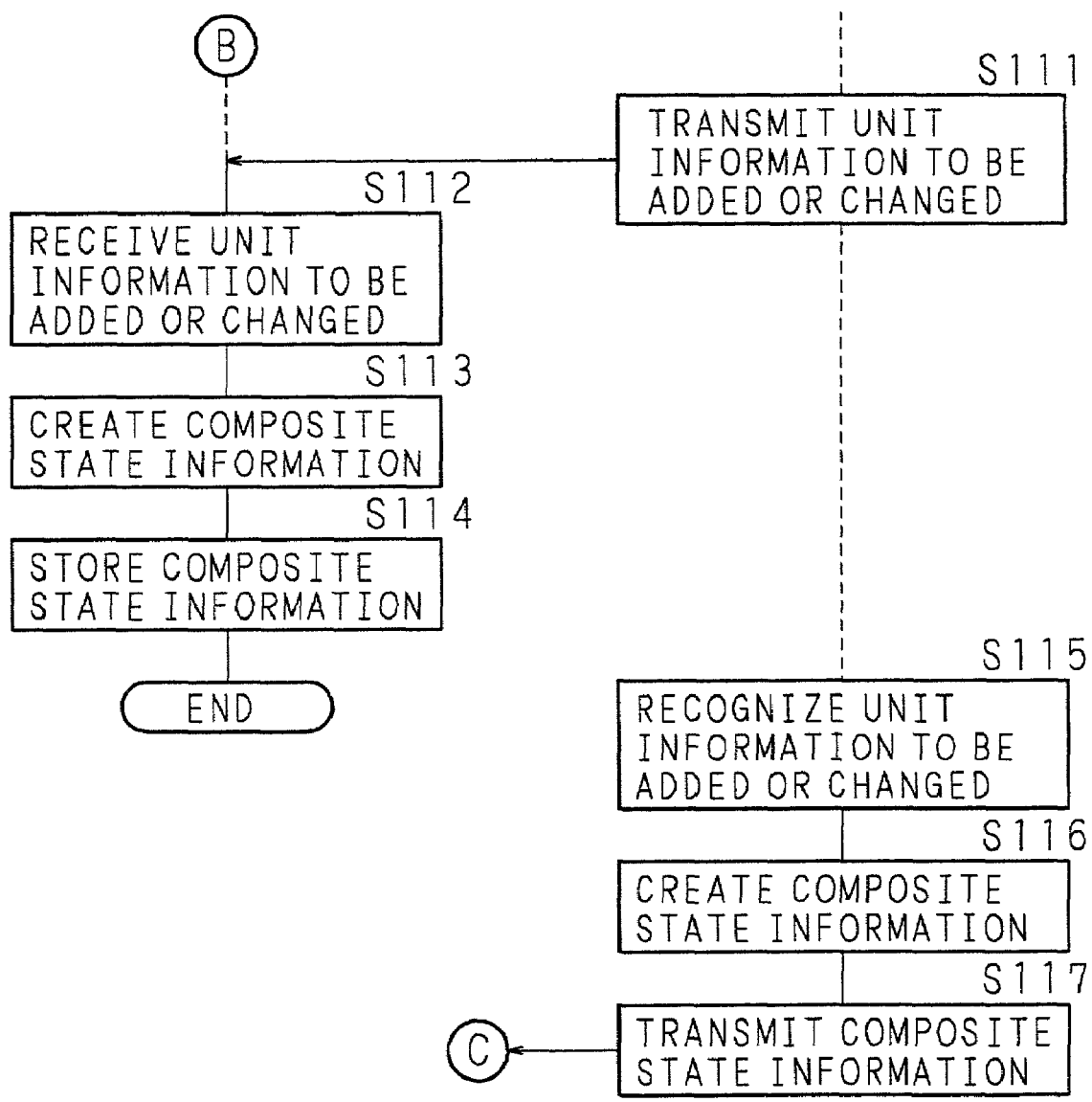
FIG. 11 is a flowchart showing the procedure performed by the managing system according to the present information.

FIG. 9 through FIG. 11 show a flowchart of the procedure performed by a managing system according to the present information. First, a seller has a business discussion with a buyer who wishes to purchase a composite apparatus 2, and selects and inputs desired unit information from the input unit 13 of the ordering apparatus 1. The inputted unit information is received (step S91), and the MPU 11 refers to the unit table 151 and creates the composite state information corresponding to the received unit information (step S92). More specifically, as described above, the MPU 11 reads the last digit in a unit code corresponding to the received unit name, further reads the digit in the field of the creating order of composite state information, and stores the last digit and the order in association with each other in the RAM 12. Moreover, the MPU 11 reads a unit code "0" corresponding to "none" for a unit U whose unit name has not been received and stores it in the RAM 12 in association with the creating order of composite state information.

Further, the MPU 11 sorts the digits stored in the RAM 12 according to the sequence of the creating order of composite state information so as to create the composite state information. In addition, the seller inputs the composite apparatus information for specifying the composite apparatus 2 and the customer information to the ordering apparatus 1. An example of the composite apparatus information is a unique code for specifying a composite apparatus 2. Further, examples of the customer information are a customer code, the name of a customer and the address of a customer. The inputted composite apparatus information and customer information are received (step S93), and the MPU 11 stores the created composite state information in the composite state information file 152 in association with the received composite apparatus information and customer information (step S94). Accordingly, the order for the composite apparatus 2 is complete, and the ordered units U are packed and delivered to the customer.

The seller sets up the units U. When the units U are composed by the setup and the power is switched on, the MPU 21 of one unit U constituting the composite apparatus 2 accesses a unit U connected to the connection port 28 and recognizes the unit information (step S95). An example of the recognizing method is implemented by storing the unit information in the storage unit, not shown, of each unit U and reads it in the manner as described above. On the basis of the read unit information, the MPU 21 refers to the unit table 251 and creates the composite state information by the same method as described above, i.e., according to a common rule (step S96).

After creating the composite state information, the MPU 21 transmits the created composite state information to the ordering apparatus 1 (step S101). Further, at this transmission, the composite apparatus information for specifying the composite apparatus 2 is transmitted together. Besides, while the composite state information is transmitted from the composite apparatus 2 to the ordering apparatus 1 in this embodiment, it is also possible to go to the composite apparatus 2 from the ordering apparatus 1 periodically to read the composite state information of the composite apparatus 2. Next, the ordering apparatus 1 refers to the composite state information file 152 by using the transmitted composite apparatus information as a key and judges whether the stored composite state information matches the transmitted composite state information (step S102). Note that, while the comparison of the composite state information is made by using the transmitted composite apparatus information as a key in this embodiment, it is also possible to compare the composite state information by using the address of the composite apparatus 2, which has transmitted the composite state information, as a key.

When the result of the comparison in step S102 shows that these pieces of composite state information do not match (NO in step S102), there is a fear that the units U are not composed according to the order, and the MPU 11 displays no-matching information indicating that these pieces of composite state information do not match on the display unit 14 (step S103) and transmits the no-matching information to the composite apparatus 2 (step S104). The composite apparatus 2 displays the transmitted no-matching information on the display unit 24 (step S105). The creation of the no-matching information is carried out as follows. The MPU 11 compares the stored composite state information and the transmitted composite state information, and extracts a digit which does not match the stored composite state information and the creating order of composite state information. For instance, when the stored composite state information is "21325201" and the transmitted composite state information is "21325202", the MPU 11 extracts the digit "2" and the creating order of composite state information "8". Then, the MPU 11 refers to the unit table 151 to read a unit type corresponding to the creating order of composite state information from the unit type field, and further reads a unit name associated with a unit code corresponding to the last digit of the extracted digits. Then, the MPU 11 displays the "unit type" and "unit name" on the display unit 14. As the display contents, for example, an HTML document such as "32 MB of the memory does not match. It should be 16 MB." may be created, displayed and transmitted to the composite apparatus 2.

When the result of the comparison in step S102 shows that these pieces of composite state information match (YES in step S102), since the stored composite state information and the transmitted composite state information match, the MPU 11 displays matching information indicating that these pieces of composite state information match on the display unit 14 (step S106), and transmits the matching information to the composite apparatus 2 (step S107). As the matching information, for example, an HTML document such as "The units U are composed correctly." may be stored in the storage unit 15 in advance so as to allow the MPU 11 to read, display and transmit it. The composite apparatus 2 displays the transmitted matching information on the display unit 24 (step S108). With the structure as described above, it is possible to prevent a difference between the units U ordered and the units U set up. Further, the stored composite state information and the transmitted composite state information are compared by the communicating means in this embodiment, but, if the ordering apparatus 1 or the composite apparatus 2 does not comprise the communicating means, the composite state information displayed on the display unit 14 of the ordering apparatus 1 or on the display unit 24 of the composite apparatus 2 may be confirmed and compared visually.

After the setup, when the composite apparatus 2 continues to be used, the customer may wish to add or change a unit U. The following description will explain a process of adding or changing a unit U. When unit information to be added or changed is inputted from the input unit 23 of the composite apparatus 2, it is transmitted to the ordering apparatus 1 (step S111). More specifically, the MPU 21 displays the stored contents in the unit table 251 on the display unit 24, receives the unit information to be added or changed, and transmits the received unit information to the ordering apparatus 1. The ordering apparatus 1 receives the transmitted unit information to be added or changed (step S112), and the MPU 11 refers to the unit table 151 and extracts the last digit and the creating order of composite state information by using the received unit information as a key. Then, the MPU 11 reads the composite state information before the addition or change by using the address of the composite apparatus 2 as a key and creates composite state information based on the extracted last digit and creating order of composite state information (step S113). Subsequently, the MPU 11 stores the created composite state information after the addition or change in the composite state information file 152 (step S114).

An order for the unit U is made based on the changed composite state information in the manner mentioned above, and the unit U to be added or changed is delivered to the customer. Then, when the seller or the customer connects the unit U to the connection port 28, the composite apparatus 2 recognizes the unit information of the added or changed unit U (step S115). More specifically, by receiving the connection of the unit U as a trigger, the composite apparatus 2 reads from one unit the unit information stored in a storage unit, not shown, of other unit U, thereby recognizing the unit information. Further, the MPU 21 creates composite state information based on the recognized unit information (step S116). Then, the MPU 21 transmits the created composite state information to the ordering apparatus 1 (step S117). Subsequently, the MPU 21 moves the process to step S102 and compares the stored composite state information and the transmitted composite state information. As described above, even when an addition or a change of a unit U after the setup is desired, it is possible to readily order the unit U to be added or changed; and, even after the addition or change of the unit U, it is possible to easily manage the composite apparatus 2 after the sale because the composite apparatus 2 is managed based on the composite state information created according to the common rule.

Embodiment 2

Figure 12:
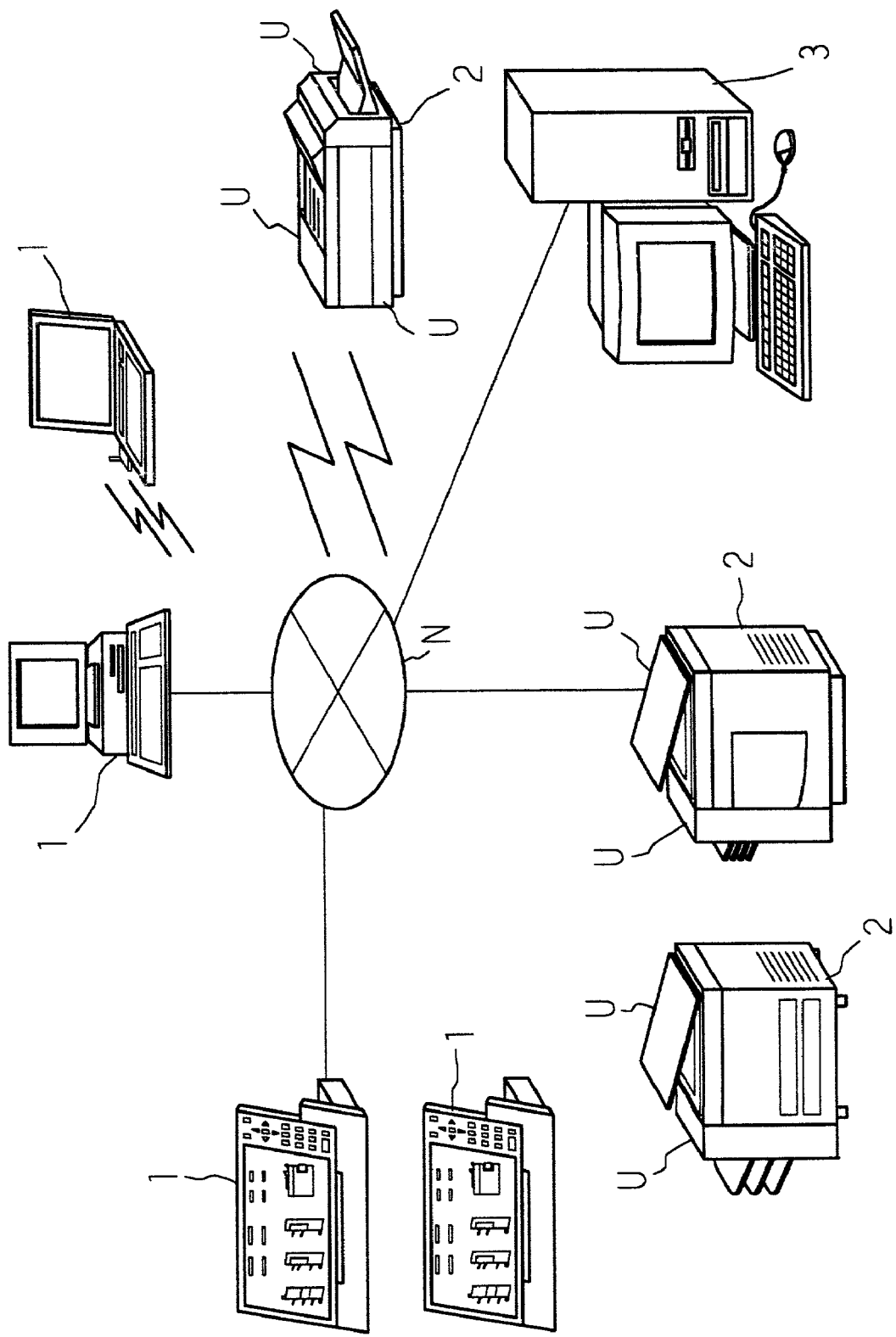
FIG. 12 is an explanatory view showing a structural example of a managing system of the present invention according to Embodiment 2.
Figure 13:
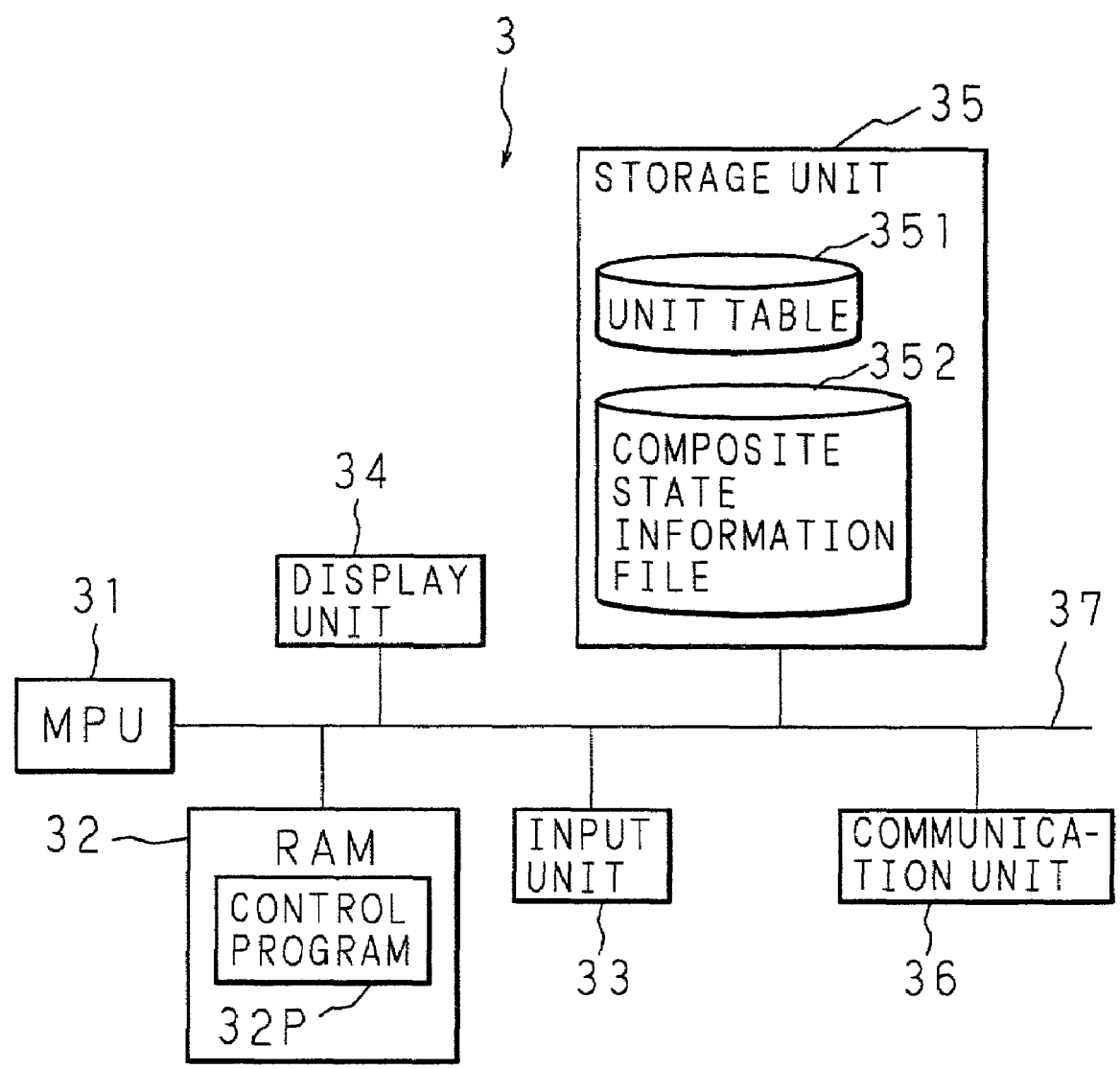
FIG. 13 is a block diagram showing a structural example of a managing apparatus.

In addition to Embodiment 1, Embodiment 2 is designed to manage the information of customers and the information of composite apparatuses 2 totally using a managing apparatus 3. FIG. 12 is an explanatory view showing a structural example of a managing system of the present invention according to Embodiment 2. FIG. 13 is a block diagram showing a structural example of the managing apparatus 3. As shown in FIG. 12, the managing apparatus 3 is connected to the ordering apparatus 1 and the composite apparatus 2 through the communication network N. The managing apparatus 3 totally manages the ordering apparatuses 1 and the composite apparatuses 2. As shown in FIG. 13, the structure of the managing apparatus 3 is the same as the structure of the ordering apparatus illustrated in FIG. 2, and therefore the detailed explanation thereof is omitted by replacing the most significant digit in the reference code of each component of the ordering apparatus 1 with "3".

FIG. 14 is an explanatory view showing one example of the record contents in a composite state information file 352 according to Embodiment 2. As shown in FIG. 14, in addition to the composite state information file 152 of Embodiment 1, ordering apparatus information for specifying an ordering apparatus 1 is stored in an ordering apparatus information field. The ordering apparatus information corresponds to a unique ordering apparatus code for identifying the ordering apparatus 1 and the address of the ordering apparatus 1. When an order for a composite apparatus 2 is made by the ordering apparatus 1, an MPU 31 stores the composite apparatus information, etc. in a storage unit 35 in association with the ordering apparatus information.

Figure 15:
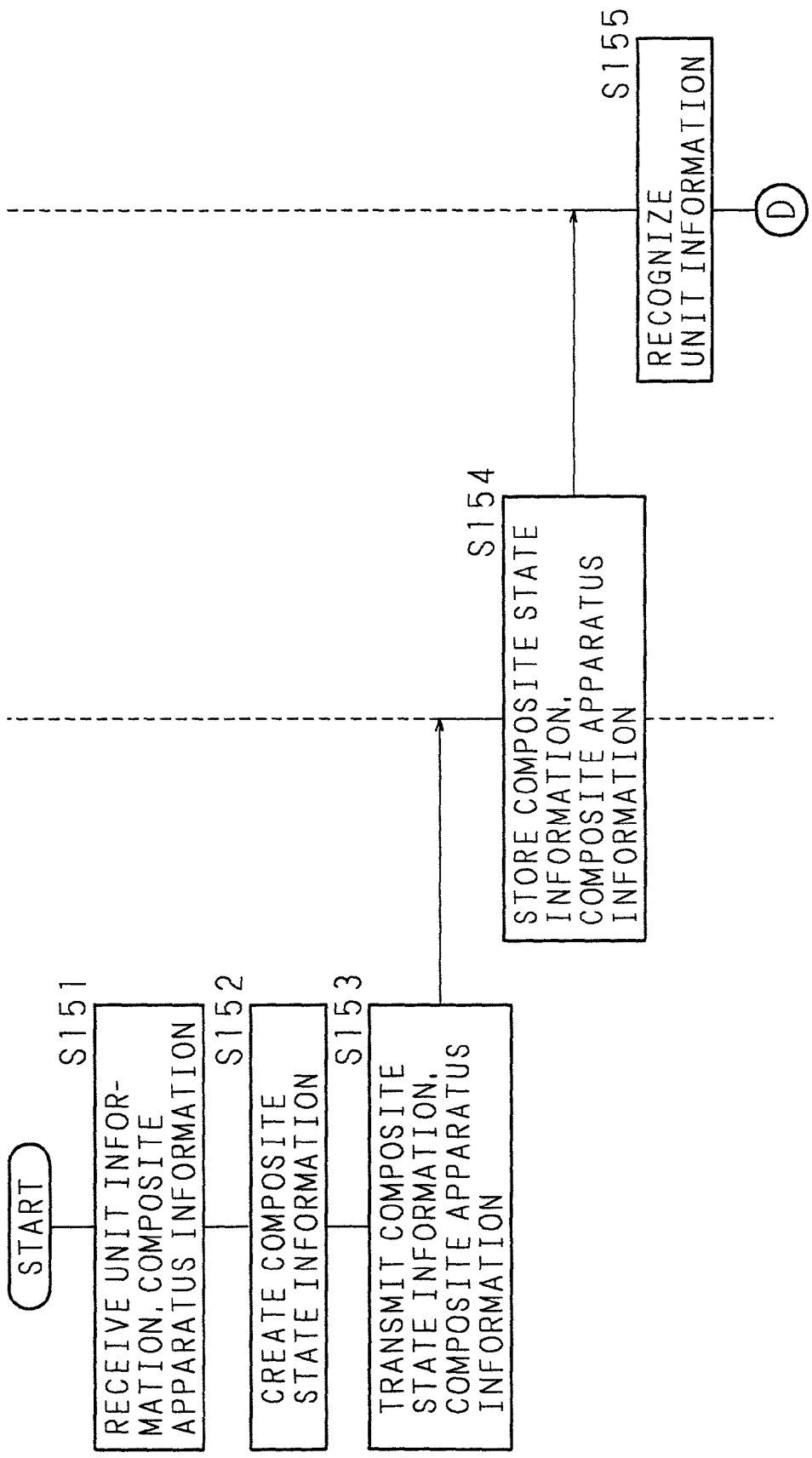
FIG. 15 is a flowchart showing the procedure performed by a managing system of the present invention according to Embodiment 2.
Figure 16:
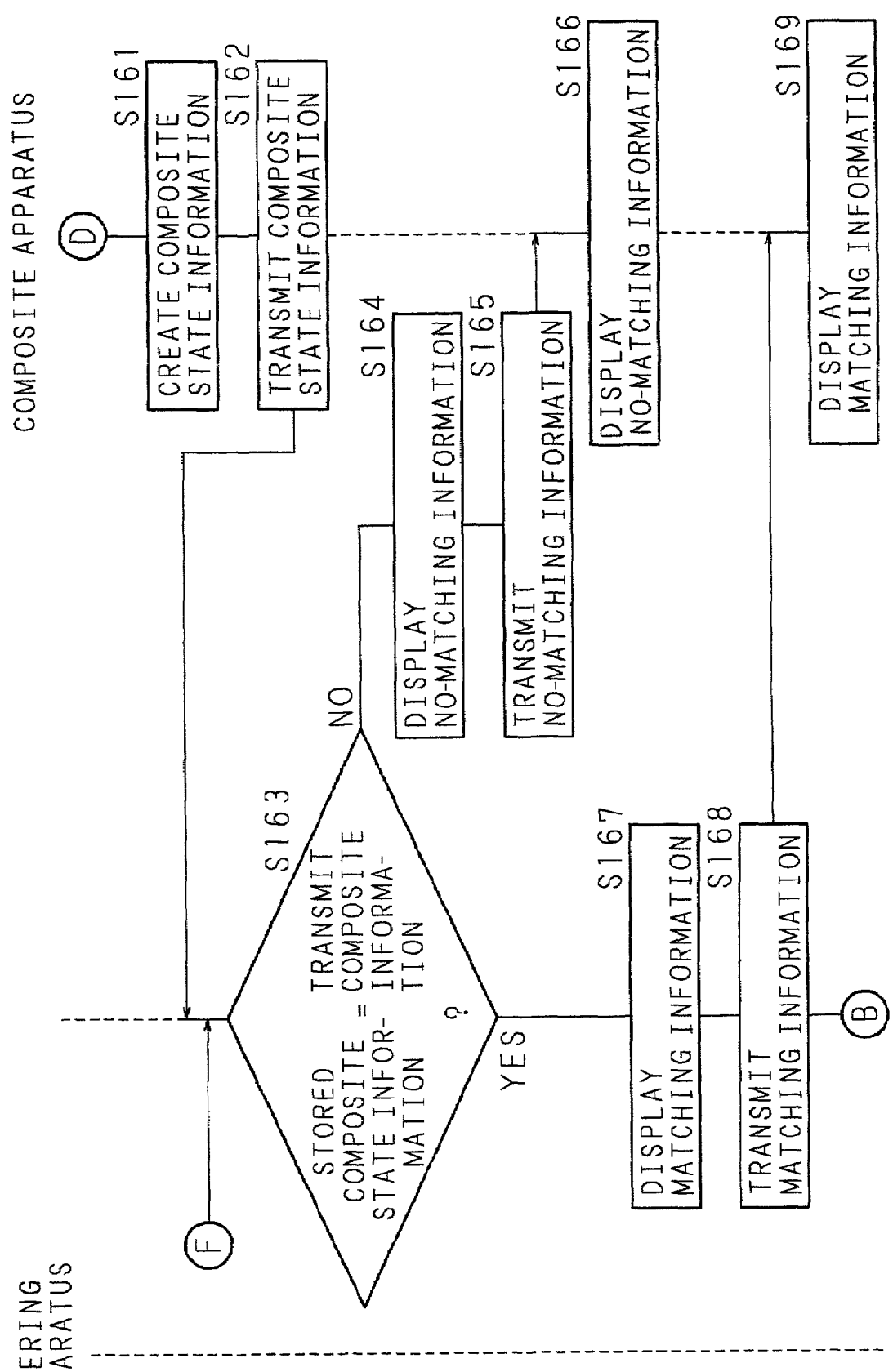
FIG. 16 is a flowchart showing the procedure performed by the managing system of the present invention according to Embodiment 2.

FIG. 15 and FIG. 16 show a flowchart of the procedure performed by the managing system of the present invention according to Embodiment 2. First, a seller has a business discussion with a buyer who wishes to purchase a composite apparatus 2, and selects and inputs desired unit information from the input unit 13 of the ordering apparatus 1. Moreover, the seller inputs the composite apparatus information for specifying the composite apparatus 2. The inputted unit information and composite apparatus information are received (step S151), and the MPU 11 creates composite state information corresponding to the received unit information with reference to the unit table 151 (step S152). The MPU 11 stores the created composite state information in the composite state information file 152 in association with the received composite apparatus information and customer information (the customer code and the name of the customer). Then, the MPU 11 reads the stored composite state information and composite apparatus information and transmits them to the managing apparatus 3 (step S153). Note that the customer information may also be transmitted at this time. The managing apparatus 3 stores the transmitted composite state information and composite apparatus information in the composite state information file 352 (step S154).

The seller sets up the units U. When the units U are composed by the setup and the power is switched on, the MPU 21 of one unit U constituting the composite apparatus 2 accesses a unit U connected to the connection port 28 and recognizes the unit information (step S155). Then, on the basis of the recognized unit information, the MPU 21 refers to the unit table 251 and creates the composite state information by the same method as described above, i.e., according to the common rule (step S161).

After creating the composite state information, the MPU 21 transmits the created composite state information to the managing apparatus 3 (step S162). Further, at this transmission, the composite apparatus information for specifying the composite apparatus 2 is transmitted together. Besides, while the MPU 21 transmits the composite state information from the composite apparatus 2 to the managing apparatus 3 in this embodiment, it is also possible to go to the composite apparatus 2 from the managing apparatus 3 periodically to read the composite state information of the composite apparatus 2. Next, the MPU 31 of the managing apparatus 3 refers to the composite state information file 352 by using the transmitted composite apparatus information as a key and judges whether the stored composite state information and the transmitted composite state information match (step S163). Note that while the MPU 31 compares the composite state information by using the transmitted composite apparatus information as a key in this embodiment, it is also possible to compare the composite state information by using the address of the composite apparatus 2, which has transmitted the composite state information, as a key.

When the result of the comparison in step S163 shows that these pieces of composite state information do not match (NO in step S163), there is a fear that the units U are not composed according to the order, and therefore the MPU 31 displays no-matching information indicating that these pieces of composite state information do not match on the display unit 34 (step S164) and also transmits the no-matching information to the composite apparatus 2 (step S165). The composite apparatus 2 displays the transmitted no-matching information on the display unit 24 (step S166). When the result of the comparison in step S163 shows that these pieces of composite state information match (YES in step S163), the stored composite state information and the transmitted composite state information match, and therefore the MPU 31 displays matching information indicating that these pieces of composite state information match on the display unit 34 (step S167) and also transmits the matching information to the composite apparatus 2 (step S168). The composite apparatus 2 displays the transmitted matching information on the display unit 24 (step S169).

Figure 17:
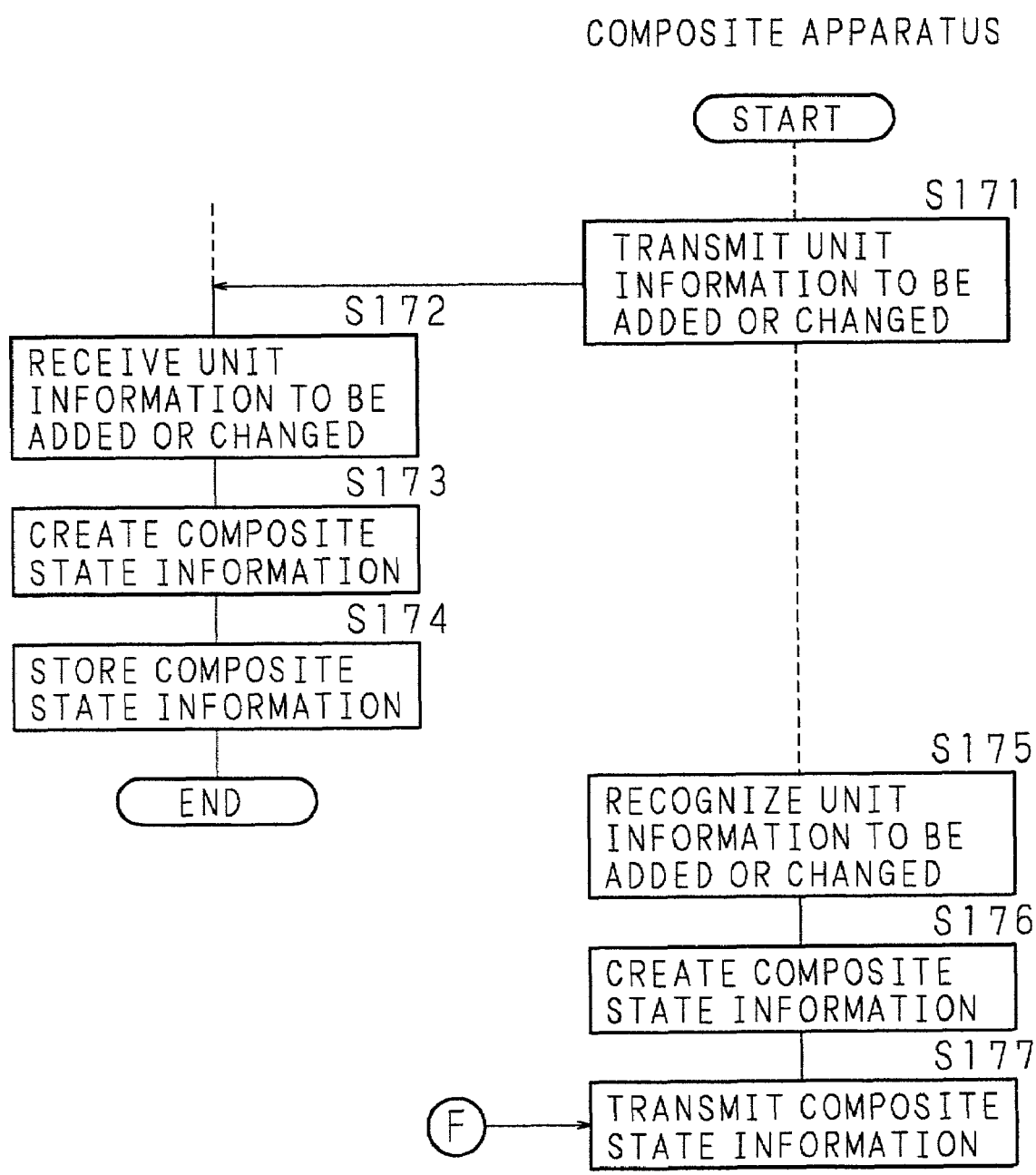
FIG. 17 is a flowchart showing the procedure to be performed when an addition or change of a unit is made in Embodiment 2.

FIG. 17 is a flowchart showing the procedure performed when an addition or change of a unit U is made in Embodiment 2. First, unit information to be added or changed is inputted from the input unit 23 of the composite apparatus 2 and transmitted to the managing apparatus 3 (step S171). The managing apparatus 3 receives the transmitted unit information to be added or changed (step S172), and the MPU 31 refers to the unit table 351 by using the received unit information as a key and extracts the last digit and the creating order of composite state information. Then, the MPU 31 reads the composite state information before the addition or change by using the address of the composite apparatus 2 as a key and creates composite state information based on the extracted last digit and creating order of composite state information (step S173). Subsequently, the MPU 31 stores the created composite state information after the addition or change in the composite state information file 352 (step S174).

An order for the unit U is made based on the changed composite state information in the manner mentioned above, and the unit U to be added or changed is delivered to the customer. Then, when the seller or the customer connects the unit U to the connection port 28, the composite apparatus 2 recognizes the unit information of the added or changed unit U (step S175). Further, the MPU 21 creates composite state information based on the recognized unit information (step S176), and transmits the created composite state information to the managing apparatus 3 (step S177). Thereafter, the MPU 31 moves the process to step S163 and compares the stored composite state information and the transmitted composite state information. As described above, since the composite state information of the composite apparatuses 2 ordered by a plurality of ordering apparatuses 1 is collectively managed by the managing apparatus 3, it is possible to improve the management efficiency.

Embodiment 2 has the above-described structure, and, since other structures and functions are the same as those of Embodiment 1, the corresponding parts are designated with the same reference numbers and detailed explanation thereof is omitted.

Embodiment 3

Figure 18:
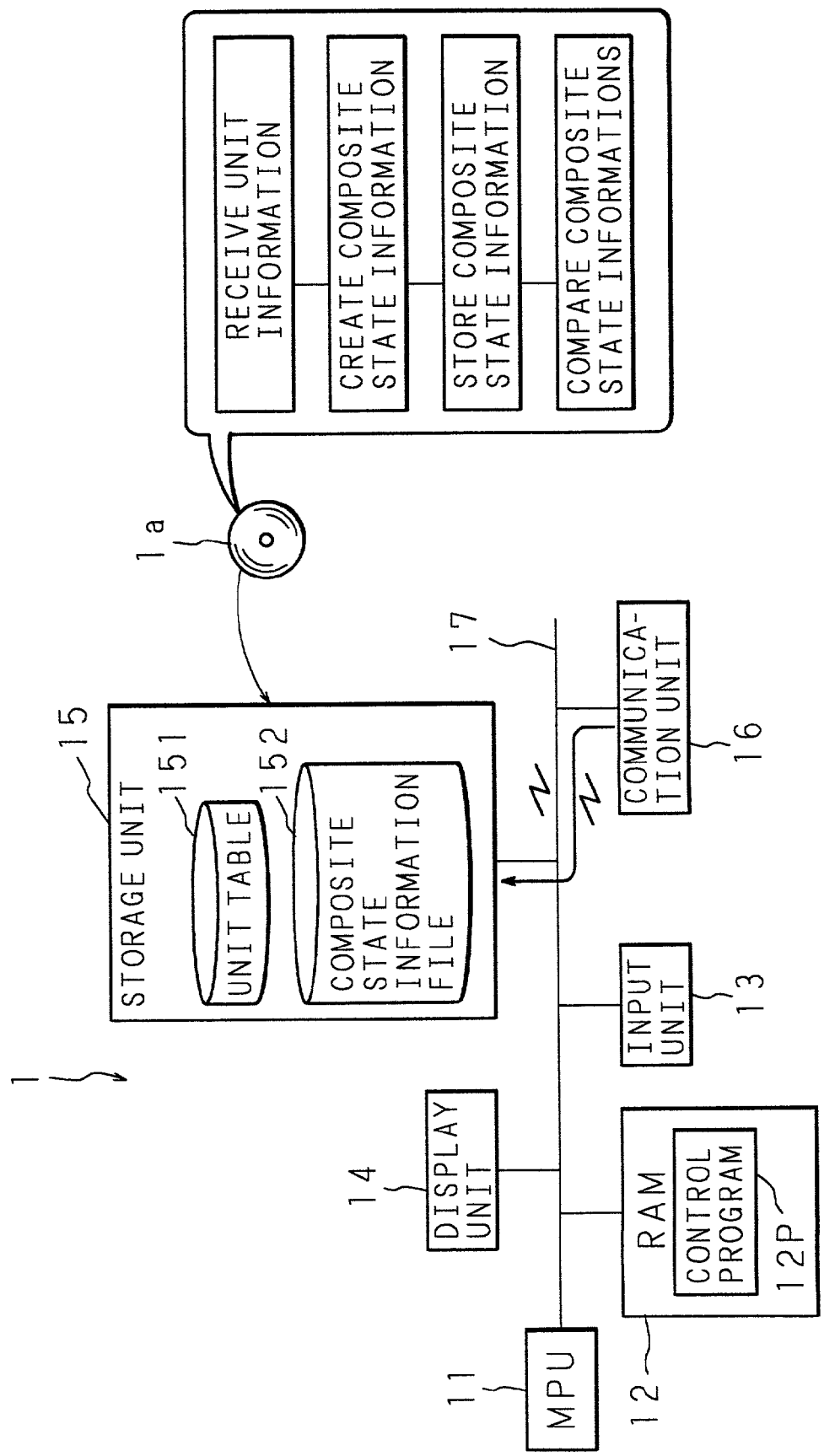
FIG. 18 is a block diagram showing the structure of an ordering apparatus according to Embodiment 3.

FIG. 18 is a block diagram showing the structure of an ordering apparatus 1 according to Embodiment 3. It is possible to provide a computer program for executing the ordering apparatus 1 of Embodiment 1 by pre-installing it in the ordering apparatus 1 as in Embodiment 2, or provide it by a removable memory product such as a CD-ROM or MO. Further, it is also possible to provide the computer program by transmitting it via a communication line. The contents are explained below.

A memory product 1a (CD-ROM, MO, DVD-ROM or the like) recording therein a program for causing the ordering apparatus 1 shown in FIG. 18 to receive unit information, create composite state information, store the composite state information and compare the composite state information is installed in the storage unit 15 of the ordering apparatus 1. Such a program is loaded in the RAM 12 of the ordering apparatus 1 and executed. Accordingly, the program functions as the ordering apparatus 1 of the present invention as mentioned above.

Embodiment 3 has the above-described structure, and, since other structures and functions are the same as those of Embodiments 1 and 2, the corresponding parts are designated with the same reference numbers and detailed explanation thereof is omitted.

As described in detail above, in the present invention, an ordering apparatus receives unit information for specifying units constituting a composite apparatus to be ordered. The ordering apparatus creates composite state information for specifying a composite state of units based on the received unit information, according to a predetermined rule. Meanwhile, the composite apparatus recognizes unit information for specifying units constituting itself and creates composite state information based on the recognized unit information, according to the same rule as the above rule. In other words, since the pieces of composite state information are created by both the ordering apparatus and the composite apparatus, respectively, based on the composite state of units, according to the common rule, and managed, it is possible to collectively manage the composite state information in any situations, such as during the ordering, shipment from a factory, setup at the customer's place, and consequently it becomes possible to prevent a difference between the composite apparatus ordered and the composite apparatus set up.

Moreover, in the present invention, since the created composite state information is stored in the ordering apparatus in association with composite apparatus information for specifying the composite apparatus, it is possible to recognize the state of the composite apparatus after the supply of the composite apparatus and quickly respond to the customer at the time of maintenance or other occasion.

Furthermore, in the present invention, the ordering apparatus and composite apparatus are connected through the communication network, and the created composite state information is transmitted from the composite apparatus to the ordering apparatus. Since the transmitted composite state information and the stored composite state information are compared in the ordering apparatus, it is possible to prevent a difference between the composite apparatus at ordering and the composite apparatus at setting up; and, even when a unit is added or changed, the unit to be added or changed can be certainly composed and the ordering apparatus can readily grasp the state of the composite apparatus after the addition.

Additionally, in the present invention, the ordering apparatus, the composite apparatus and the managing apparatus for managing the composite apparatus are connected through the communication network, and the created composite state information and the composite apparatus information for specifying the composite apparatus are transmitted from the ordering apparatus to the managing apparatus. Similarly, the created composite state information is transmitted from the composite apparatus to the managing apparatus. Then, the managing apparatus compares the composite state information transmitted from the ordering apparatus and the composite state information transmitted from the composite apparatus, and therefore, even when a large number of ordering apparatuses and composite apparatuses are present, the present invention can produce advantageous effects such as effective support for the use of this system by collective management.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A managing method for ordering a composition of a plurality of units to form a composite apparatus which is a copying machine, a facsimile machine, a printing machine, or a composite machine comprising multiple of said machines, through an ordering apparatus and for managing said ordered composite apparatus, the method comprising:

causing said ordering apparatus to receive unit information for specifying units constituting an actual composite apparatus, which is the copying machine, the facsimile machine, the printing machine, or the composite machine comprising multiple of said machines, and create composite state information for specifying a composite state of units based on the received unit information, according to a predetermined rule;

causing said actual composite apparatus, when said actual composite apparatus is actually set up by actual units and the power is switched on, to recognize unit information for specifying actual units to be actually composed itself, and create composite state information for specifying a composite state of actual units based on the recognized unit information, according to the same rule as said predetermined rule;

causing said actual composite apparatus to inform the composite state information to said ordering apparatus; and comparing the composite state information created by said ordering apparatus and the composite state information informed by said actual composite apparatus.

2. A managing system comprising an ordering apparatus and a composite apparatus, for ordering said composite apparatus which is a copying machine, a facsimile machine, a printing machine, or a composite machine comprising multiple of said machines, through said ordering apparatus and for managing said ordered composite apparatus, wherein said ordering apparatus comprises:

means for receiving unit information for specifying units constituting an actual composite apparatus which is the copying machine, the facsimile machine, the printing machine, or the composite machine comprising multiple of said machines; and first creating means for creating composite state information for specifying a composite state of units based on the received unit information, according to a predetermined rule, and said actual composite apparatus comprises:

means for recognizing unit information for specifying actual units to be composed itself when said actual composite apparatus is actually set up by actual units and the power is switched on;

second creating means for creating composite state information for specifying a composite state of actual units based on the recognized unit information, according to the same rule as said rule; and informing means for informing the composite state information to said ordering apparatus.

3. The managing system as set forth in claim 2, wherein said ordering apparatus further comprises storing means for storing the composite state information created by said first creating means in association with composite apparatus information for specifying the actual composite apparatus.

4. The managing system as set forth in claim 3, wherein said ordering apparatus and said actual composite apparatus are connected through a communication network, said informing means of said actual composite apparatus transmits the composite state information created by said second creating means to said ordering apparatus, and said ordering apparatus further comprises means for comparing the transmitted composite state information and the composite state information corresponding to the composite apparatus information stored by said storing means.

5. The managing system as set forth in claim 2, further comprising a managing apparatus, connected to said ordering apparatus and said actual composite apparatus through a communication network, for managing said actual composite apparatus, wherein said ordering apparatus further comprises means for transmitting the composite state information created by said first creating means and composite apparatus information for specifying the actual composite apparatus to said managing apparatus, said informing means of said actual composite apparatus transmits the composite state information created by said second creating means to said managing apparatus, and said managing apparatus further comprises means for comparing the composite state information transmitted from said ordering apparatus and the composite state information transmitted from said actual composite apparatus.

6. A composite apparatus which is a copying machine, a facsimile machine, a printing machine, or a composite machine comprising multiple of said machines, comprising:

means for the composite apparatus, which is the copying machine, the facsimile machine, the printing machine, or the composite machine comprising multiple of said machines, recognizing unit information for specifying actual units to be composed itself when said composite apparatus is actually set up by actual units and the power is switched on;

means for creating composite state information for specifying a composite state of actual units based on the recognized unit information, according to a predetermined rule; and means for informing the created composite state information to an ordering apparatus.

7. An ordering apparatus for ordering a composite apparatus which is a copying machine, a facsimile machine, a printing machine, or a composite machine comprising multiple of said machines, comprising:

means for receiving unit information for specifying units constituting an actual composite apparatus which is the copying machine, the facsimile machine, the printing machine, or the composite machine comprising multiple of said machines;

means for creating composite state information for specifying a composite state of units based on the received unit information, according to a predetermined rule; and means for, when receiving composite state information created, when said actual composite apparatus is actually set up by actual units and the power is switched on, according to the same rule as said predetermined rule and transmitted from the actual composite apparatus specified by the composite apparatus information stored by a storing means, comparing received composite state information and the composite state information stored in said storing means.

8. A recording medium on which a computer program is stored, the computer program for ordering a composite apparatus which is a copying machine, a facsimile machine, a printing machine, or a composite machine comprising multiple of said machines, the recording medium causing, via the computer program, steps comprising the following to be performed:

causing a computer to receive unit information for specifying units constituting an actual composite apparatus which is the copying machine, the facsimile machine, the printing machine, or the composite machine comprising multiple of said machines, causing a computer to create composite state information for specifying a composite state of units based on the received unit information, according to a predetermined rule;

causing a computer to store the created composite state information in association with composite apparatus information for specifying the actual composite apparatus; and causing a computer to, when receiving composite state information created, when said actual composite apparatus is actually set up by actual units and the power is switched on, according to the same rule as said predetermined rule and transmitted from the actual composite apparatus specified by the stored composite apparatus information, compare received composite state information and the stored composite state information.

9. A memory product readable by computers and storing therein a computer program for ordering a composite apparatus which is a copying machine, a facsimile machine, a printing machine, or a composite machine comprising multiple of said machines, including:

computer readable code means to cause a computer for receiving unit information for specifying units constituting an actual composite apparatus which is the copying machine, the facsimile machine, the printing machine, or the composite machine comprising multiple of said machines;

computer readable code means to cause a computer for creating composite state information for specifying a composite state of units based on the received unit information, according to a predetermined rule;

computer readable code means to cause a computer for storing the created composite state information in association with composite apparatus information for specifying the actual composite apparatus; and computer readable code means for causing a computer to, when receiving composite state information created, when said actual composite apparatus is actually set up by actual units and the power is switched on, according to the same rule as said rule and transmitted from the actual composite apparatus specified by the stored composite apparatus information, compare received composite state information and the stored composite state information.

* * * * *